(12) United States Patent
Furuyama

(10) Patent No.: US 8,328,433 B2
(45) Date of Patent: Dec. 11, 2012

(54) OPTICAL/ELECTRICAL COMPOSITE CABLE

(75) Inventor: Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 321 days.

(21) Appl. No.: 12/562,537

(22) Filed: Sep. 18, 2009

(65) Prior Publication Data

US 2010/0150573 A1 Jun. 17, 2010

(30) Foreign Application Priority Data

Dec. 12, 2008 (JP) ................................. 2008-317005

(51) Int. Cl.
*G02B 6/36* (2006.01)
*G02B 6/44* (2006.01)
*H04B 10/12* (2006.01)

(52) U.S. Cl. ........................ 385/89; 385/101; 398/142
(58) Field of Classification Search .................. 385/89, 385/101; 398/142
See application file for complete search history.

(56) References Cited

U.S. PATENT DOCUMENTS 5,148,042 A * 9/1992 Nakazoe ........................ 307/60
7,444,446 B2 10/2008 Yamaguchi et al.
2005/0053340 A1 3/2005 Toriumi et al.
2006/0215973 A1* 9/2006 Onishi .......................... 385/101
2008/0247757 A1* 10/2008 Um et al. ..................... 398/106
2009/0149702 A1* 6/2009 Onoda et al. ................. 600/102

FOREIGN PATENT DOCUMENTS

JP 2004-350155 12/2004

OTHER PUBLICATIONS

U.S. Appl. No. 12/562,451, filed Sep. 18, 2009, Furuyama.

* cited by examiner

*Primary Examiner* — Jerry Blevins
(74) *Attorney, Agent, or Firm* — Oblon, Spivak, McClelland, Maier & Neustadt, L.L.P.

(57) ABSTRACT

An optical/electrical composite cable in which a first connector having an optical transmission unit is connected to a second connector having an optical reception unit via an electrical wire and optical wiring line is provided. The optical transmission unit and optical reception unit are driven by electrical power supplied from an external electronic device. A detection unit that detects a removal/attachment operation of at least one of the first and second connectors and an interruption unit that interrupts supply of electrical power to the optical transmission unit and optical reception unit when the removal/attachment operation is detected by the detection unit are provided.

20 Claims, 4 Drawing Sheets

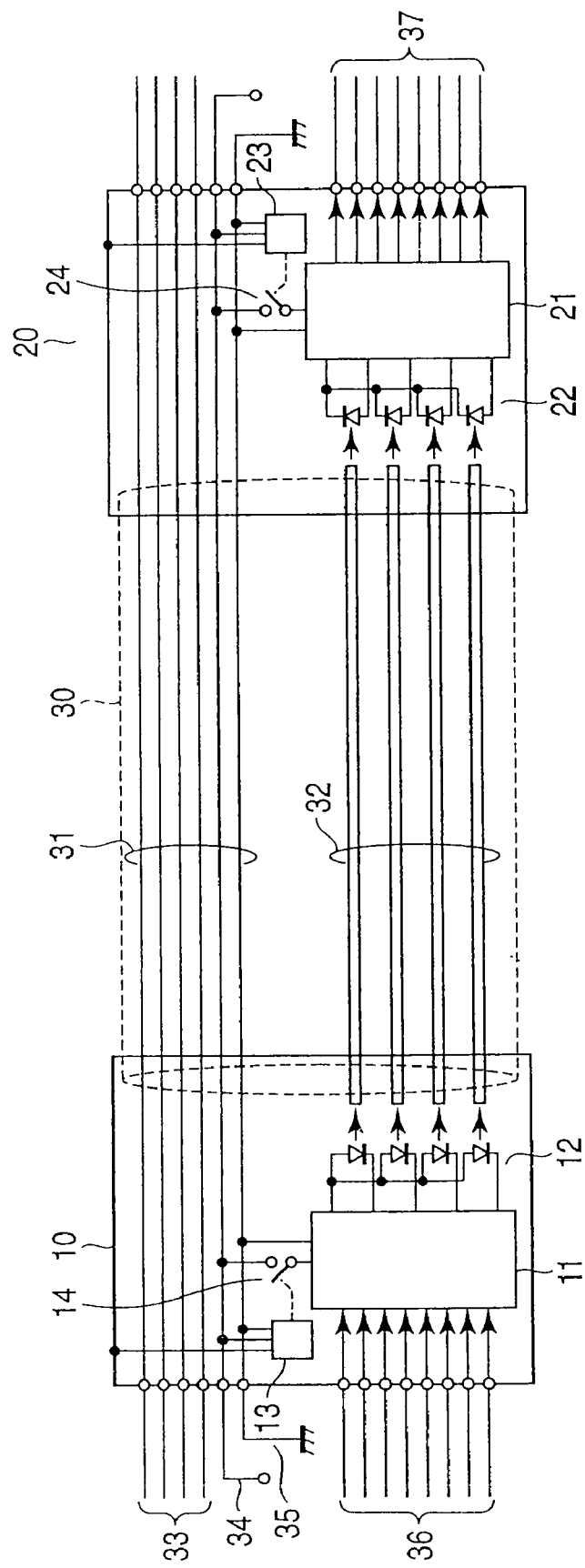
F I G. 1

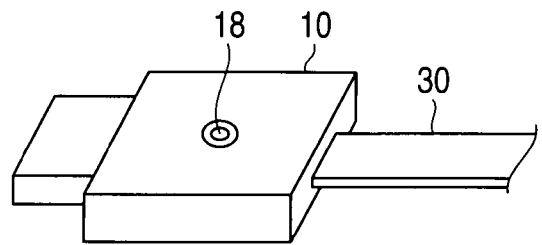
F I G. 2
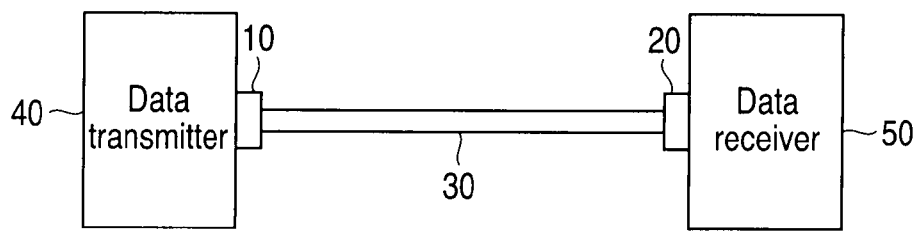
F I G. 3
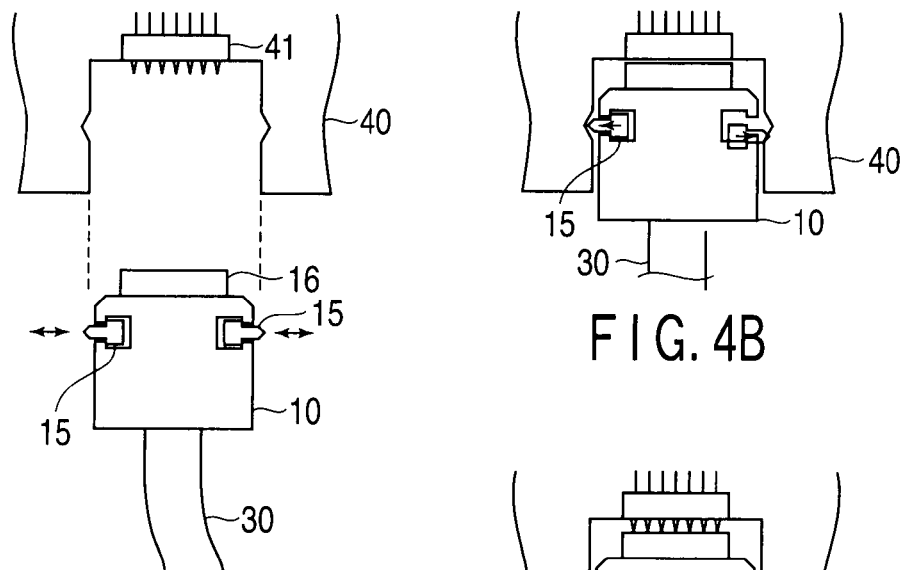
F I G. 4A
F I G. 4B
F I G. 4C

OPTICAL/ELECTRICAL COMPOSITE CABLE

CROSS-REFERENCE TO RELATED APPLICATIONS

This application is based upon and claims the benefit of priority from prior Japanese Patent Application No. 2008-317005, filed Dec. 12, 2008, the entire contents of which are incorporated herein by reference.

BACKGROUND

Recently, an attempt is made to dramatically enhance the operation speeds of LSIs as the performances of electronic devices such as bipolar transistors and field effect transistors are enhanced. With the enhancement, a problem of erroneous operation due to electromagnetic noise and the limitation in the operating speed of an electrical wire used for connection between electronic devices occurs. Particularly, improvement of the definition of a display device and an increase in the amount of video data make the above problem more significant. In order to cope with the problem related to the wire, some optical wiring devices that transmit signals by means of light are proposed.

Further, an optical communication system in which the power source of an optical device is turned on only when connection between the electronic devices is correctly made is proposed (for example, JP-A 2004-350155(KOKAI)).

SUMMARY

According to one aspect of this invention, there is provided an optical/electrical composite cable including a first connector detachably attached to a first electronic device, a second connector detachably attached to a second electronic device, an electrical wire connected between the first and second connectors, an optical wiring line connected between the first and second connectors, an optical transmission unit provided in the first connector and driven by electrical power supplied from one of the first and second electronic devices, an optical reception unit provided in the second connector and driven by electrical power supplied from one of the first and second electronic devices, a detection unit that detects a removal/attachment operation of at least one of the first and second connectors, and an interruption unit that interrupts supply of electrical power to at least one of the optical transmission unit and optical reception unit whose removal/attachment operation is detected when the removal/attachment operation is detected by the detection unit.

According to another aspect of this invention, there is provided an optical/electrical composite cable including a first connector detachably attached to a first electronic device, a second connector detachably attached to a second electronic device, an electrical wire connected between the first and second connectors, an optical wiring line connected between the first and second connectors, an optical transmission unit provided in the first connector and driven by electrical power supplied from one of the first and second electronic devices, an optical reception unit provided in the second connector and driven by electrical power supplied from one of the first and second electronic devices, a first detection unit provided in the first connector to detect a removal/attachment operation of the connector, a second detection unit provided in the second connector to detect a removal/attachment operation of the connector, a first interruption unit that interrupts supply of electrical power to the optical transmission unit when a removal/attachment operation thereof is detected by the first detection unit, and a second interruption unit that interrupts supply of electrical power to the optical reception unit when a removal/attachment operation thereof is detected by the second detection unit.

BRIEF DESCRIPTION OF THE DRAWING

FIG. 1 is a schematic configuration view showing an optical/electrical composite cable according to a first embodiment.

FIG. 2 is a view showing a removal/attachment detection unit used for the optical/electrical composite cable according to the first embodiment.

FIG. 3 is a view showing a state in which the optical/electrical composite cable according to the first embodiment is connected between a data transmitter and a data receiver.

FIGS. 4A to 4C are views showing an example of a removal/attachment detection unit used for an optical/electrical composite cable according to a second embodiment.

DETAILED DESCRIPTION OF THE INVENTION

Figure 5:
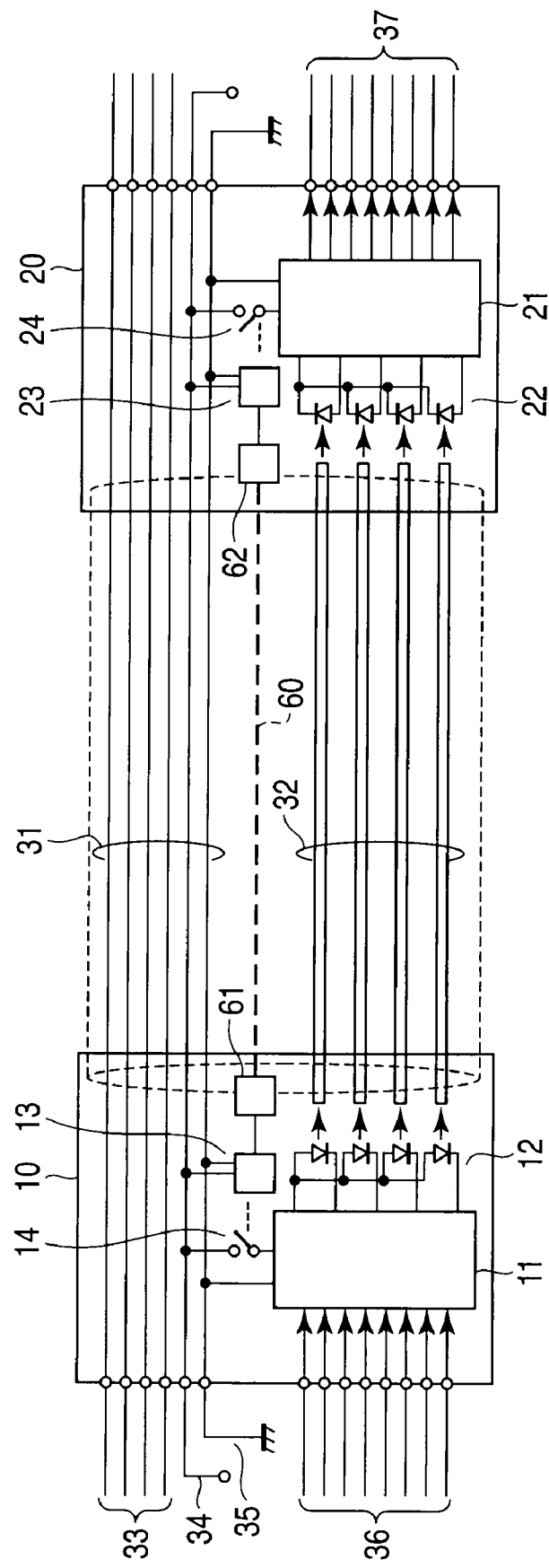
FIG. 5 is a schematic configuration view showing an optical/electrical composite cable according to a third embodiment.

Embodiments of the present invention will be described below with reference to the accompanying drawings. In this case, the explanation is made by taking several concrete constituents as an example, but constituents that have the same functions can be realized in a similar fashion and this invention is not limited to the embodiments described below.

First Embodiment

In data transmission using optical wires, it is necessary to provide power sources of optical interfaces (an optical transmitter having a light-emitting element and an optical receiver having a light-receiving element) of a light-emitting element and light-receiving element on both of the transmission side and reception side, respectively. At this time, even if electrical power is supplied to only one of the transmission side and reception side, it is necessary to insert a power source line in an optical/electrical composite cable and previously connect the power sources on the transmission side and reception side in order to operate units on both of the transmission side and reception side. Further, there occurs almost no case wherein a low-speed signal (such as a control signal) causes a problem of erroneous operation due to electromagnetic noise and the limitation in the operating speed of electrical wires and it is sometimes more convenient to connect them by means of an electrical wire. In order to meet the above requirements, it is desired to provide an optical/electrical composite cable having not only an optical wire but also an electrical wire. However, there sometimes occurs a problem that the optical interface is damaged due to an inadvertent removal/attachment accident and the optical/electrical composite cable falls into a recovery impossible state or surge breakdown of the optical interface due to hot swapping of the connector of the optical/electrical composite cable occurs.

On the other hand, as is described in Jpn. Pat. Appln. KOKAI Publication No. 2004-350155, an optical communication system in which the power source of the optical device is turned on only when connection between the electronic devices is correctly made is proposed. However, the system detects removal or breakage of the optical fiber cable to control light emission from the optical communication device and is not used to prevent occurrence of surge breakdown or damage of the optical interface contained in the optical/electrical composite cable.

FIG. 1 is a schematic configuration view showing an optical/electrical composite cable according to a first embodiment of this invention.

In FIG. 1, a symbol 10 indicates a transmission-side connector (first connector) detachably attached to a data transmitter (first electronic device) and 20 a reception-side connector (second connector) detachably attached to a data receiver (second electronic device). A plurality of electrical wires 31 and a plurality of optical wiring lines 32 are connected between the connectors 10 and 20. The electrical wires 31 and optical wiring lines 32 connected between the connectors 10 and 20 are shielded by a cable-coating member 30. The electrical wires 31 are provided to continuously extend from the device connection terminals of the connector 10 to the device connection terminals of the connector 20.

The transmission-side connector 10 has terminals connected to a plurality of lines 33, 34, 35, 36 of the data transmitter. The lines 33 are control lines, the line 34 is a power supply line, the line 35 is a ground line and the lines 36 are high-speed signal lines. The terminals connected to the control lines 33, power supply line 34 and ground line 35 are connected to the electrical wirings 31.

In the transmission-side connector 10, an optical transmission unit 11, light-emitting element 12, first optical link control unit (detection unit) 13 and first optical link switch (interruption unit) 14 are provided. The input port of the optical transmission unit 11 is connected to terminals of the high-speed signal lines 36 and the output port thereof is connected to the light-emitting element 12. An electrical signal obtained via the high-speed signal lines 36 is converted into a light signal by means of the light-emitting element 12 and the thus converted light signal is transmitted to the optical wiring lines 32. Further, the optical transmission unit 11 is connected to the power source line 34 via the switch 14 for electrical power supply and connected to the ground line 35.

The optical link control unit 13 is connected to part of a connector housing, power source line 34 and ground line 35 and sets the switch 14 into an OFF state when the removal/attachment operation of the transmission-side connector 10 is detected.

As the optical link control unit 13, any device that detects touch to the connector housing can be used and, for example, a capacitance-type touch sensor may be incorporated in the connector 10. More specifically, as shown in FIG. 2, a capacitance-type touch sensor is incorporated in the connector 10 and a detection pin 18 is exposed to the exterior of the connector 10 to detect a variation in the capacitance when a person touches the pin 18.

The switch 14 may be any type of switch that is set in an OFF state at the no-control time and is set in an ON state only when electrical power is supplied to the power source line 34 and a removal/attachment detection signal from the control unit 13 is not received. For example, it can be configured by an enhancement MOS transistor. Specifically, a circuit that biases the gate of the enhancement MOS transistor used as the switch 14 to turn ON the same when a removal/attachment state is not detected may be provided in the control unit 13.

The switch 14 and control unit 13 can be configured by semiconductor elements whose operating speed is lower than that of the optical transmission unit 11. In the switch 14 and control unit 13, a high-withstand voltage element whose operating speed is low and a surge absorption circuit may be used to prevent destruction by surge voltage or the like.

Like the transmission-side connector 10, the reception-side connector 20 has terminals connected to the plural lines 33, 34, 35 of the data receiver and terminals connected to high-speed signal lines 37 of the data receiver.

In the reception-side connector 20, an optical reception unit 21, light-receiving element 22, second optical link control unit (detection unit) 23 and second optical link switch (interruption unit) 24 are provided. The input port of the optical reception unit 21 is connected to the light-receiving element 22 to which the optical wiring lines 32 are optically connected. A light signal obtained via the optical wiring lines 32 is converted into an electrical signal by means of the light-receiving element 22 and the thus converted electrical signal is transmitted to the terminals of the high-speed signal lines 37. Further, the optical reception unit 21 is connected to the power source line 34 via the switch 24 for electrical power supply and connected to the ground line 35.

The optical link control unit 23 is connected to part of a connector housing, power source line 34 and ground line 35 and sets the switch 24 into an OFF state when the removal/attachment operation of the reception-side connector 20 is detected.

As the optical link control unit 23, like the control unit 13, any device that detects touch to the connector housing can be used and, for example, a capacitance-type touch sensor may be incorporated in the connector 20.

In this embodiment, the configuration is made to interrupt supply of electrical power to its own optical interface when the removal/attachment operation of one of the connectors is detected, but electrical power is not interrupted with respect to the other connector. This is based on the assumption that it becomes difficult to pass a surge current when the cable is long to some extent. Therefore, when the power source line is commonly used as shown in FIG. 1, the optical interface of one of the connectors may be sometimes broken at the time of the removal/attachment operation of the other connector. Therefore, in such a case, it is possible to link the optical link control units 13 and 23 together and permit both of the optical link switches 14 and 24 to perform the interrupting operation when the removal/attachment operation of one of the connectors is detected.

That is, as shown in FIG. 1, the first optical link control unit 13 is provided in the transmission-side connector 10 and the second optical link control unit 23 is provided in the reception-side connector 20. However, it is possible to provide the above functions in one of the control units and permit one of the control units to set the switches 14, 24 into the OFF state when the removal/attachment operation with respect to the data transmitter or data receiver is detected. Further, the power source line in FIG. 1 may be formed to extend to the optical interface (only to the internal portions of the connectors 10, 20) and supplies of electrical power may be separately performed on the transmission side and reception side. In addition, a switch may be provided on the cable side (on the connector side on which it is connected) with respect to each optical interface of the power source line and supply of electrical power to the cable can be simultaneously interrupted when supply of electrical power to the optical transmission unit 11 or optical reception unit 21 is interrupted.

Further, it is not always required to independently form the devices 11 to 14 in the transmission-side connector 10 and they can be formed in one chip. Likewise, the devices 21 to 24 in the reception-side connector 20 may be formed in one chip.

With the above configuration, as shown in FIG. 3, when a data transmitter 40 is connected to the transmission-side connector 10 and a data receiver 50 is connected to the reception-side connector 20, electrical powers are supplied to optical transmission unit 11 in the connector 10 and the optical reception unit in the connector 20 via the switches 14, 24 and, as a result, connection between the data transmitter 40 and the data receiver 50 can be made.

If the user touches one of the connectors 10, 20 to remove the cable from the electronic devices 40, 50, the removal/attachment operation is detected by the control unit 13, 23 and the switch 14, 24 is set into the OFF state. When the switch 14, 24 is set into the OFF state, supply of electrical power to the optical transmission unit 11 or optical reception unit 21 is interrupted. Therefore, even if the connectors 10, 20 are removed from the electronic devices, surge voltage will not propagate from the connected terminal portion to the optical interface formed of a high-speed (low-withstand voltage) semiconductor element.

Thus, according to this embodiment, the optical/electrical composite cable can be protected by previously detecting an artificial removal/attachment operation with respect to the optical/electrical composite cable and it becomes possible to instantly cope with a child's mischief and the like. That is, breakage of the optical transmission unit 11 or optical reception unit 21 due to an inadvertent removal/attachment accident can be previously prevented and, as a result, it becomes easier to apply the optical/electrical composite cable to consumer appliances and an effect that it can be contributed to propagation of high-definition video equipments is attained.

Second Embodiment

In the first embodiment, the touch sensors that detect the removal/attachment operations of the connectors 10, 20 are used, but lock mechanisms generally provided in the connectors 10, 20 can be utilized instead of the sensors.

FIGS. 4A to 4C are views showing a connection state and the configuration of the main portion of a transmission-side connector used for an optical/electrical composite cable according to a second embodiment of this invention. Portions that are the same as those of FIG. 1 are denoted by the same symbols and the detailed explanation thereof is omitted.

The basic configuration of the optical/electrical composite cable itself is the same as that of FIG. 1 and this embodiment is different from the first embodiment in that the lock mechanism of the connector is utilized to detect the removal/attachment of the connector. Further, in the drawing, only the transmission-side connector 10 is shown, but the reception-side connector 20 is also formed with the same configuration.

As shown in FIG. 4A, safety lock pins 15 biased towards the outside by springs or the like are provided on the connector 10 and the position of the pin 15 can be detected by an optical link control unit 13. That is, the attachment state of the connector is detected according to the state in which the pin 15 protrudes and the state in which the pin 15 is pushed in.

A guide hole into which the connector 10 is inserted is formed in a data transmitter 40 and a connection terminal 41 that is connected to an end terminal 16 of the connector 10 is provided on the bottom portion of the guide hole. Further, grooves with V-shaped cross sections that are engaged with the pins 15 of the connector 10 are formed in the side surfaces of the guide hole.

As shown in FIG. 4B, with a removal/attachment detection unit of this embodiment, since the pins 15 protrude while the connector 10 is correctly attached to the data transmitter 40, the control unit 13 does not detect the removal/attachment operation and the switch 14 is kept in the ON state.

As shown in FIG. 4C, since the pin 15 is pushed in when the connector 10 is going to be disconnected from the data transmitter 40, the control unit 13 detects the removal/attachment operation and the switch 14 is changed into the OFF state.

With the above configuration, like the first embodiment described before, the artificial removal/attachment of the optical/electrical composite cable is previously detected, the optical/electrical composite cable can be protected and thus the same effect as that of the first embodiment can be attained. Further, in this embodiment, an advantage that only a clear removal/attachment operation can be detected is attained.

Third Embodiment

FIG. 5 is a schematic configuration view showing an optical/electrical composite cable according to a third embodiment of this invention. Portions that are the same as those of FIG. 1 are denoted by the same symbols and the detailed explanation thereof is omitted.

The basic configuration of the optical/electrical composite cable is the same as that of FIG. 1 and this embodiment is different from the first embodiment in that a tension sensor used to detect that the optical/electrical composite cable is stretched is provided as a detection unit for detecting removal or attachment of a connector.

A wire 60 is stretched over between a transmission-side connector 10 and a reception-side connector 20, one end of the wire 60 is connected to a tension sensor 61 provided in the transmission-side connector 10 and the other end thereof is connected to a tension sensor 62 provided in the reception-side connector 20. Tension applied to the wire 60 is detected by the sensors 61, 62 and detection information items thereof are input to optical link control units 13, 23. In the control units 13, 23, if tension obtained by means of the sensors 61, 62 becomes greater than or equal to preset tension, switches 14, 24 are turned OFF.

With the above configuration, it becomes possible to cope with the operation of pulling the intermediate portion of an optical/electrical composite cable or an inadvertent accident of catching the cable by the foot of a passerby. Thus, the optical/electrical composite cable can be protected from an inadvertent accident. Further, the mechanical protection of the optical/electrical composite cable itself can be attained by setting the strength of a connector lock mechanism lower than the cable destruction strength.

Fourth Embodiment

Figure 6:
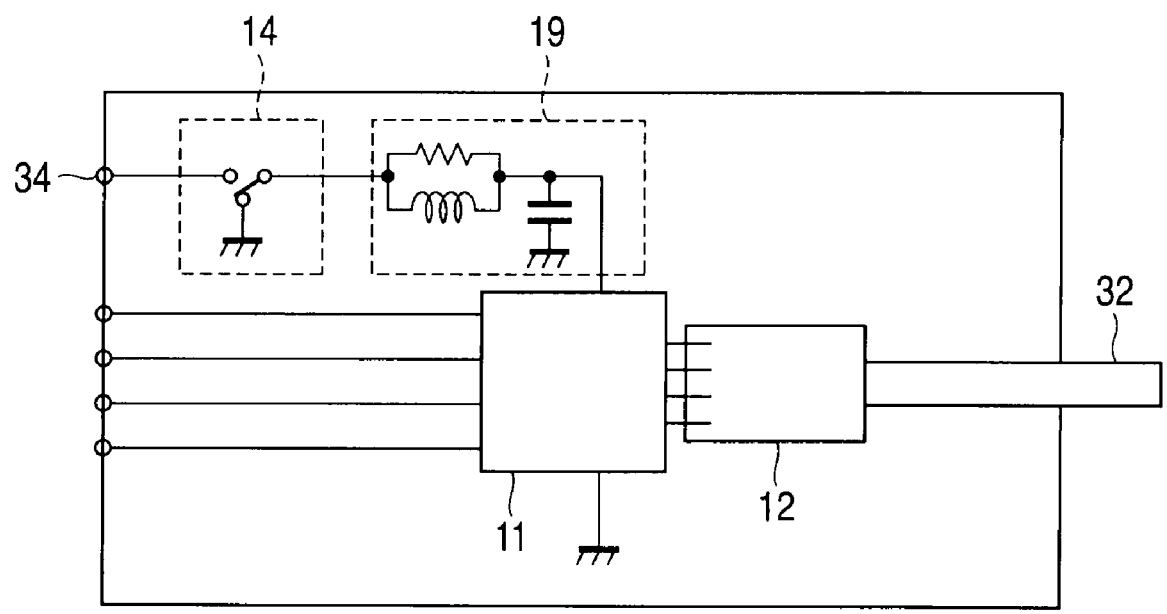
FIG. 6 is a view showing an example of a slow start filter, for illustrating the main configuration of an optical/electrical composite cable according to a fourth embodiment.

FIG. 6 is a schematic configuration view showing an example in which a filter 19 for a slow start operation is provided in a power supply line of an optical transmission unit and optical reception unit, for illustrating a fourth embodiment of this invention.

The filter 19 for the slow start operation is inserted between a switch 14 and an optical transmission unit 11. As the filter 19, only a CR integration circuit can be used to perform the slow start operation. However, since a power loss occurs in a resistive (R) portion, a current is stably supplied via an inductor (L). The LCR value may be determined according to the current capacity and filter frequency.

In FIG. 6, only the transmission side is shown, but the same configuration can be made on the reception side. Further, the configuration of this embodiment can be applied to any one of the first to third embodiments.

When the above filter 19 is provided, a surge caused by turning ON/OFF the switch 14 can be absorbed without fail and damages of the optical transmission unit 11 and optical reception unit 21 caused by the surge can be previously prevented. Therefore, the reliability of the optical/electrical composite cable can be further enhanced by using this embodiment in combination with the first to third embodiments.

Modification

This invention is not limited to the above-described embodiments. For example, the above-described embodiments of this invention indicate several concrete examples, but they are only examples of the configuration and other means (circuits, structures, device configurations and the like) can be used as the individual constituents according to the objectives of this invention. Further, the configurations shown in the embodiments are provided only as examples and the embodiments can be combined and embodied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical/electrical composite cable comprising:
a first connector detachably attached to a first electronic device,
a second connector detachably attached to a second electronic device,
an electrical wire connected between the first and second connectors,
an optical wiring line connected between the first and second connectors,
an optical transmission unit provided in the first connector and driven by electrical power supplied from one of the first and second electronic devices,
an optical reception unit provided in the second connector and driven by electrical power supplied from one of the first and second electronic devices,
a detection unit that detects a removal/attachment operation of at least one of the first and second connectors, and
an interruption unit that interrupts supply of electrical power to at least one of the optical transmission unit and optical reception unit whose removal/attachment operation is detected when the removal/attachment operation is detected by the detection unit.

2. The cable of claim 1, wherein the detection unit is a capacitance-type touch sensor that detects touch to the connector.

3. The cable of claim 1, wherein the detection unit detects release of a lock mechanism that securely holds attachment of the connector to one of the first and second electronic devices.

4. The cable of claim 1, wherein the detection unit detects tension applied to the electrical wire and optical wiring line.

5. The cable of claim 1, further comprising a filter for a slow start operation provided in an electrical power supply path to the optical transmission unit and optical reception unit.

6. The cable of claim 1, further comprising an electrical power supply line connected to one of the first and second electronic devices in part of the electrical wire, wherein an operation of supplying electrical power to the optical transmission unit and optical reception unit is performed via the electrical power supply line.

7. The cable of claim 1, wherein supply of electrical power to the optical transmission unit and optical reception unit is permitted only when the first connector is connected to a data transmitter and the second connector is connected to a data receiver.

8. The cable of claim 1, wherein the interruption unit interrupts supply of electrical power to the electrical wire when the removal/attachment operation is detected by the detection unit.

9. The cable of claim 1, wherein the interruption unit interrupts supply of electrical power to both the optical transmission unit and the optical reception unit when the detection unit detects a removal/attachment operation of at least one of the first and second connectors.

10. The cable of claim 9, wherein the detection unit is a capacitance-type touch sensor that detects touch to the connector.

11. The cable of claim 9, wherein the detection unit detects release of a lock mechanism that securely holds attachment of the connector to one of the first and second electronic devices.

12. The cable of claim 9, wherein the detection unit detects tension applied to the electrical wire and optical wiring line.

13. The cable of claim 9, further comprising a filter for a slow start operation provided in an electrical power supply path to the optical transmission unit and optical reception unit.

14. The cable of claim 9, further comprising an electrical power supply line connected to one of the first and second electronic devices in part of the electrical wire, wherein an operation of supplying electrical power to the optical transmission unit and optical reception unit is performed via the electrical power supply line.

15. An optical/electrical composite cable comprising:
a first connector detachably attached to a first electronic device,
a second connector detachably attached to a second electronic device,
an electrical wire connected between the first and second connectors,
an optical wiring line connected between the first and second connectors,
an optical transmission unit provided in the first connector and driven by electrical power supplied from one of the first and second electronic devices,
an optical reception unit provided in the second connector and driven by electrical power supplied from one of the first and second electronic devices,
a first detection unit provided in the first connector to detect a removal/attachment operation of the first connector,
a second detection unit provided in the second connector to detect a removal/attachment operation of the second connector,
a first interruption unit that interrupts supply of electrical power to the optical transmission unit when a removal/attachment operation of the first connector is detected by the first detection unit, and
a second interruption unit that interrupts supply of electrical power to the optical reception unit when a removal/attachment operation of the second connector is detected by the second detection unit.

16. The cable of claim 15, wherein each detection unit is a capacitance-type touch sensor that detects touch to its respective connector.

17. The cable of claim 15, wherein each detection unit detects release of a lock mechanism that securely holds attachment of its respective connector to one of the first and second electronic devices.

18. The cable of claim 15, wherein each detection unit detects tension applied to the electrical wire and optical wiring line.

19. The cable of claim 15, further comprising a filter for a slow start operation provided in an electrical power supply path to the optical transmission unit and optical reception unit.

20. The cable of claim 15, further comprising an electrical power supply line connected to one of the first and second electronic devices in part of the electrical wire, wherein an operation of supplying electrical power to the optical transmission unit and optical reception unit is performed via the electrical power supply line.

* * * * *